May 22, 1962  G. A. BARTHOLOMEW  3,035,704
APPARATUS FOR RESOLVING A MIXTURE OF LIQUIDS AND SOLIDS
Filed June 6, 1957
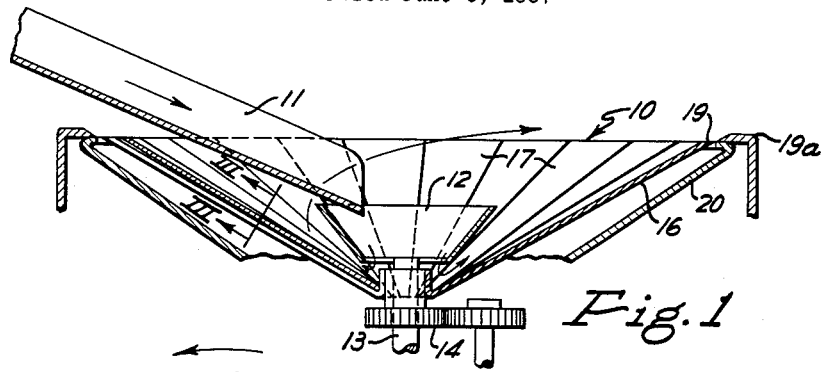
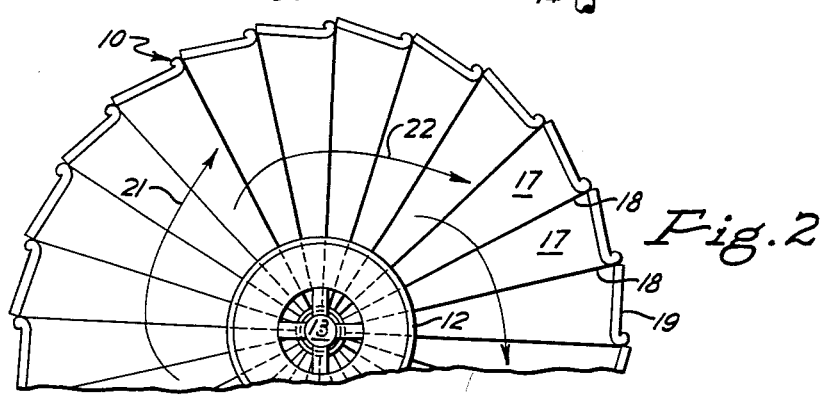
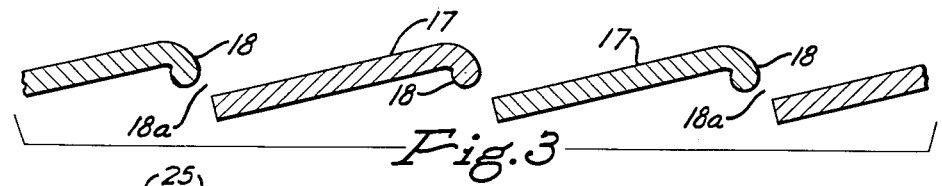
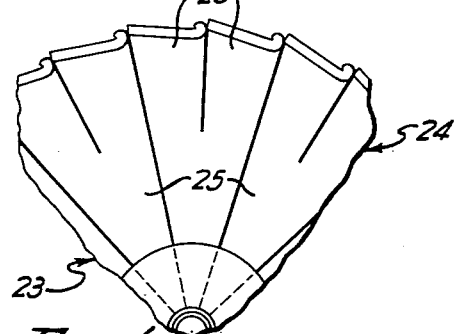
INVENTOR.
GEORGE A. BARTHOLOMEW
BY
Brown, Critchlow, Flick & Peckham
ATTORNEYS

United States Patent Office 3,035,704
Patented May 22, 1962

3,035,704
APPARATUS FOR RESOLVING A MIXTURE OF LIQUIDS AND SOLIDS
George A. Bartholomew, 1743 Jamestown Place, Pittsburgh, Pa.
Filed June 6, 1957, Ser. No. 664,049
3 Claims. (Cl. 210—369)

This invention relates to the resolution of a mixture of solids and liquid, whereby essentially dry solids are produced and the solids or liquid may be recovered for such subsequent use as is desired.

A primary object of this invention is to provide improved apparatus for the resolution of a mixture of solids and liquid into its components, which apparatus effects such separation rapidly and requires less space for a given separation than has characterized apparatus used for this purpose heretofore.

In the U.S. Patent No. 2,422,464, issued to Tracy Bartholomew on June 17, 1947, there is disclosed apparatus for resolving a mixture of liquid and solids. That apparatus comprises a series of rings having the peripheral edge of each ring turned away from the inside surface of each ring. These rings are mounted to define a bowl that is rotated about its vertical axis. Rotation of the bowl forces a mixture of solids and liquid fed thereto over the surfaces of the rings. Resolution of the mixture occurs as a result of the tendency of the liquid to form a film on and cling to the surface of the ring members and to follow those surfaces at the turned down periphery while centrifugal force tends to diverge the solids from the path of the liquid film. Hence, an increment of the liquid separates at each edge and dry solids can be produced by use of a suitable plurality of such ring members.

Considerable tonnages of unexcelled dry granulate have been produced by use of Tracy Bartholomew's invention. The theory of separation has been proven to be sound.

In the described Bartholomew apparatus a mixture, such as slag-water, is made to move across the separatory surfaces under the influence of centrifugal force resulting from rotation of the apparatus. Consequently, the path of the liquid-solid mixture is essentially a spiral and the mixture leaves the peripheral edge of each of the ring elements of the apparatus in a line which tends toward tangency therewith. A particular object of the present invention is to provide apparatus employing the principles disclosed in that patent, but in such manner that resolution of a mixture of liquids and solids can be effected with greater efficiency.

I have now discovered that greater advantage of Tracy Bartholomew's principle of separation can be obtained by providing the separatory edges of a rotating separatory bowl in a position such that a liquid-solids mixture passes thereover in a direction that is essentially normal to those edges. In the simplest embodiment of the invention, this involves providing a rotatable separatory bowl with a plurality of circumferentially spaced slots extending from its central portion outwardly towards its periphery. These slots define a plurality of radially extending segments, and the trailing edge portion of each is turned downward, or outwardly from the inside surface of the bowl. Consequently, each separatory surface is in that position, with respect to the path of a mixture fed thereto, so that the mixture goes across the separatory edge and diverted liquid passes downwardly away from the mixture rather than part of it passing along a separatory edge as is characteristic of known apparatus.

In this manner a greater amount of liquid can be separated from a liquid-solids mixture than has, heretofore, been possible. This result permits the construction of separatory bowls, of a given efficiency or separating capacity, that are much more compact than those presently known. A result of the invention that could not have been predicted even by one skilled in the art is that mixture of solid materials and liquid formed, for example, by quenching molten material, can be separated so rapidly and efficiently that the resultant dry solids frequently retain sufficient heat to fuse adjacent particles. It is believed that this latter advantage is a result of the increased number of separatory edges that are present and the fact that the effective number of edges contacted by the mixture may be about 3 to 8 times the actual number present, since the bowl normally is rotated at such a speed that each edge passes under the mixture a plurality of times before the solids finally leave the bowl over its outer edge.

The invention will be described further in conjunction with the appended drawing in which:

FIG. 1 is a side view in section of a separatory bowl of this invention;

FIG. 2 is a horizontal view of a portion of the bowl of FIG. 1;

FIG. 3 is a cross-section, to an enlarged scale taken along the line III—III of FIG. 1; and FIG. 4 is a schematic representation of a portion of another arrangement of the segments of a separatory bowl's side-wall.

The invention will be described with respect to the resolution of a slag-water mixture. It should be understood, however, that other mixtures, such as coal-water, sand-water, gravel-water and the like, may be resolved with the apparatus in a similar manner.

Referring to FIG. 1, the mixture to be resolved normally is obtained by water-quenching molten slag to cause the slag to granulate, and is delivered to the separatory bowl 10 by trough 11. The mixture advantageously is fed to the bowl surface through a means such as truncated cone-like guiding member 12, that facilitates distribution of the mixture around the bottom of the separatory bowl.

Separatory bowl 10 is supported on a shaft 13 provided with a gear 14 that meshes with a similar gear 15 attached to a power source (not shown). While shaft 13 is shown as supporting the bowl from beneath it, the bowl may be suspended on the end of a shaft which extends above it; the particular adaptation chosen normally is determined by the conditions under which the apparatus is used. In operation the bowl is rotated about its vertical axis and the mixture that is fed thereto travels, under the influence of centrifugal force, outwardly from the center up the side-wall 16 of the bowl. As pointed out above, the path of the mixture is such that it defines a spiral with the shaft 13 being its center or longitudinal axis.

The side-wall 16 of the separatory bowl is made of upwardly-extending segments 17, each of which has a turned-back edge portion 18, shown most clearly in FIGS. 2 and 3. These turned back edge portions of the segments can be considered as lip means associated with the otherwise essentially flat segments. The segments are arranged so that liquid following the turned-back edges can pass between adjacent elements through slots 18a. The size of the circumferentially spaced slots defined by adjacent segments should not be so great that the free-fall of the mixture in passing from surface to surface will carry it between the elements and through the slot rather than to the next surface. Considering the bowl when it is rotating, the turned-back edge portions are the trailing edges of the elements. While the segments are shown terminating at the shaft, it is apparent that a relatively flat center member may be provided and the segments connected to that member's periphery if desired.

It should be realized that the extent to which each edge portion 18 is turned away from the inside surface of the bowl, as shown in the drawings, is merely illustrative and is not to be conisdered as limiting the invention. The degree to which the edge should be turned back is determined by such factors as the nature of the liquid-solids mixture being resolved, the speed of rotation of the bowl, the interfacial tension between the metal surface and the liquid, the concentration of solids at a given edge and the like. Generally it may be stated that the more gentle the deviation of the turned back edge from the plane of the element, the greater will be the quantity of liquid separated at that edge, all other considerations being equal. Of course while the quantity of liquid separated per edge is important and should be as great as possible, the actual deviation chosen also should be consistent with space limitations and similar considerations.

A liquid-solids mixture on the segments can be considered to be composed of two parts. One is a film of liquid that is directly adjacent or touching the surface of the segment and wets it. The other is the main body of the mixture, i.e., all the other liquid and solids present. As the trailing edge or lip means of a segment moves beneath the two portions (the film and the body), the body of the mixture will pass to the next segment because there is no appreciable force acting on it other than centrifugal force. The film, however, is held to that segment by interfacial tension and therefore has a force acting on it in addition to the centrifugal force. The film therefore tends to follow the curvature of the segment and is diverted away from the path of the major portion (body) of the mixture because of that additional and significant force. This diversion of the film of liquid upon following the turned back edge 18 or lip means permits the film to escape from the bowl through the space 18a between the trailing edge or lip means of one segment and the next segment rather than jumping to the surface of the next segment. Thus, a partial separation occurs. Since the two portions, that is the film and the body, are going in diverging paths because of the interfacial tension which effectively acts only on the film, it is evident that separation is achieved simply by suitable design of the curvature of the trailing edge or lip means and spacing of the next adjacent segment so that its front or leading edge will intersect those two different paths. Thus, the main body of liquid and solids will reach the surface of that next segment while the film will go below it and escape through the slot 18a from the bowl. Such a partial separation occurs at each segment. These partial separations continue until the solids pass over the outer edge 19 of the bowl and pass or are deflected, as by deflector plate 19a, to a collecting means (not shown). Liquid that is separated at each edge falls to a deflecting baffle 20 which guides it to a drain or other collecting receptacle, depending on the disposition of the liquid desired.

The arrows 21 and 22 on FIG. 2 show the general path of a liquid-solid mixture over the surfaces which, as a composite, comprise the inner surface of the separatory bowl 10. It is apparent by mere inspection that the direction of the mixture with respect to any of the separatory edges 18 is far more conducive to liquid separation than arrangements known heretofore because the mixture tends to cross each edge rather than leave it tangentially and a very large number of effective edges is thus obtained.

The paths shown in FIG. 2 are slightly distorted to emphasize the point being made. The path of the mixture immediately after entering the bowl is simply outwardly away from the center. It then begins to curve into a spiral path and at the extremity of the side wall, the mixture's path most closely approximates a circle. For maximum efficiency of separation, the placement of the separatory edges should take into account the described change in the direction of the mixture.

One arrangement of the segments in accordance with this invention which is designed with a view to even greater efficiency is shown in FIG. 4. As there shown, the bowl sidewall is composed of segments 25 which have been cut along their center line and part of their length and the appropriate resulting edge turned down to provide an additional lip means or separatory edge. The sidewall, thus, in essence, has two separatory sections. An inner separatory section is defined by numeral 23 and an outer separatory section denoted by numeral 24. Separatory section 24 has more separatory edges by virtue of the cut segments as just described.

It is apparent that the apparatus herein disclosed is particularly advantageous for resolving a liquid-solid mixture into its components. A typical use involves the ready disposal of blast furnace slag. By quenching the molten slag after it is removed from the furnace, the slag is solidified and granulated and may be disposed of immediately without having to store it until the dissipation of heat permits it so to solidify. Granulated slag is of commercial importance as an aggregate in various applications. By rapidly separating the water from the quenched slag, as by use of this invention, the solidified slag would be essentially dried as a consequence of my invention through utilization of its heat and could be shipped immediately.

Another application to which this invention may be put takes advantage of an entirely unexpected result of the efficiency of the unit. By quenching slag with the minimum amount of water required to granulate and then resolving the mixture with my apparatus, the separation can be effected so rapidly that only a minimum of the heat of the slag is lost during the process. Consequently, the slag granulate retains sufficient heat to fuse adjacent particles. By collecting the dried granulate immediately upon its leaving the separatory bowl and placing it in forms, the slag can fuse to a single mass which may be utilized as a structural unit. It is thus apparent that the invention opens up an entirely new by-product possibility to blast furnace operation wherein slag is normally quenched, upon leaving the furnace, for disposal purposes.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. Apparatus for resolving a mixture of liquid and solid particles fed thereto, comprising a bowl rotatable on a vertical axis, the bowl having a sidewall that is formed by outwardly and upwardly sloping and radially extending segments spaced from one another along their edges and thereby defining a plurality of circumferentially spaced slots through the bowl sidewall and in length extending from the central portion outward towards the periphery of the bowl sidewall, each segment having a leading edge portion and a trailing edge portion with lip means curved downward away from the inside surface of the bowl, whereby when said mixture is fed to the central part of the rapidly rotating bowl the mixture will flow outward by centrifugal force, a thin film of the liquid at the surfaces of said segments will set on those segments and be attracted thereto by interfacial tension, and said thin film of liquid wetting said surfaces being incrementally and successively diverted from the path of said mixture by preferentially following the curved surfaces of said lip means on the segments at said trailing edges under the influence of said interfacial tension and escaping from said bowl through said slots while the remainder of said mixture advances to the surface of the next adjacent segment, the leading edge of each segment being interposed between the path of said diverted film of liquid and the normal path of said mixture from segment to segment, and said solid particles are eventually thrown off said bowl at the periphery of its sidewall, means for rotating said bowl and means to feed and distribute a mixture uniformly about the bottom of said bowl.

2. Apparatus in accordance with claim 1 including means for collecting solid materials discharged from said bowl substantially free of liquid.

3. Apparatus in accordance with claim 1, said segments define an inner separatory section and an outer separatory section with the greater number of separatory sections formed in said outer separatory section.

References Cited in the file of this patent

UNITED STATES PATENTS

| | | |
|---|---|---|
| 6,763 | Jenks | Oct. 2, 1849 |
| 2,149,252 | Cleveland | Mar. 7, 1939 |
| 2,210,999 | Bartholomew | Aug. 13, 1940 |
| 2,422,464 | Bartholomew | June 17, 1947 |
| 2,727,629 | Hertrich | Dec. 20, 1955 |
| 2,806,603 | Van Der Molen | Sept. 17, 1957 |